(12) United States Patent
Do et al.

(10) Patent No.: US 9,472,354 B2
(45) Date of Patent: Oct. 18, 2016

(54) ELECTRODES FOR CAPACITORS FROM MIXED CARBON COMPOSITIONS

(71) Applicants: Inhwan Do, East Lansing, MI (US); Hyunjoong Kim, East Lansing, MI (US)

(72) Inventors: Inhwan Do, East Lansing, MI (US); Hyunjoong Kim, East Lansing, MI (US)

(*) Notice: Subject to any disclaimer, the term of this patent is extended or adjusted under 35 U.S.C. 154(b) by 178 days.

(21) Appl. No.: 14/203,608

(22) Filed: Mar. 11, 2014

(65) Prior Publication Data

US 2014/0268495 A1   Sep. 18, 2014

Related U.S. Application Data

(60) Provisional application No. 61/786,745, filed on Mar. 15, 2013.

(51) Int. Cl.

| | |
|---|---|
| *H01G 11/36* | (2013.01) |
| *H01G 11/24* | (2013.01) |
| *H01G 11/86* | (2013.01) |
| *H01G 11/38* | (2013.01) |
| *H01G 11/28* | (2013.01) |
| *H01G 11/68* | (2013.01) |
| *B82Y 99/00* | (2011.01) |
| *B82Y 30/00* | (2011.01) |

(52) U.S. Cl.
CPC .............. *H01G 11/36* (2013.01); *H01G 11/24* (2013.01); *H01G 11/28* (2013.01); *H01G 11/38* (2013.01); *H01G 11/68* (2013.01); *H01G 11/86* (2013.01); *B82Y 30/00* (2013.01); *B82Y 99/00* (2013.01); *Y02E 60/13* (2013.01); *Y10S 977/948* (2013.01); *Y10T 156/1044* (2015.01)

(58) Field of Classification Search
CPC ...... H01G 9/155; H01G 11/34; H01G 11/50; H01G 11/62; H01G 11/06; H01G 11/28; H01G 11/30; H01G 9/038; H01G 11/32; H01G 11/48; H01G 9/058; H01G 11/04; H01G 11/24; H01G 11/38; H01G 11/46; H01G 11/52; H01G 11/60; H01G 11/72; H01G 11/86; H01G 9/02; H01G 11/02; H01G 11/36; H01G 11/64; H01G 11/66; H01G 11/68; H01G 11/84; H01G 9/10
See application file for complete search history.

(56) References Cited

U.S. PATENT DOCUMENTS

2003/0048594 A1* 3/2003 Shinozaki .............. H01G 9/155
361/502
2012/0321913 A1* 12/2012 Hua ....................... H01G 11/38
429/7

* cited by examiner

*Primary Examiner* — Dion R Ferguson

(57) ABSTRACT

Wet carbon paper processing, wet carbon papers, electrodes prepared from such wet carbon papers, and capacitors prepared from such electrodes.

29 Claims, 3 Drawing Sheets

ELECTRODES FOR CAPACITORS FROM MIXED CARBON COMPOSITIONS

This application claims priority from U.S. Provisional application Ser. No. 61/786,745 filed Mar. 15, 2013.

A portion of the work disclosed herein was conducted under United States Air Force Research laboratory contract # FA 9453-12-M-0032.

The inventions described herein deal with wet carbon paper processing, wet carbon papers, prepared from mixed carbon compositions and electrodes prepared from such wet carbon papers, and capacitors prepared from such electrodes.

BACKGROUND OF THE INVENTION

Prior art searches were conducted for graphene/carbon or graphene/graphite electrochemical double layer electrodes. Only one reference suggests coating carbon with graphene. Several references include graphene, activated carbon and graphite individually as possible components of electrochemical double layer electrodes but do not suggest a combination of the same, or any benefit of such combinations. Further, none of the prior art references deal with a wet process for preparing carbon papers for use in electrodes using such combinations of carbon.

In U.S. Patent publication 2012/0088156A, entitled METHOD FOR MANUFACTURING POSITIVE ELECTRODE ACTIVE MATERIAL FOR ENERGY STORAGE DEVICE AND ENERGY STORAGE DEVICE, there is taught a multistep method to produce electrodes that includes adding graphene oxide to an electrode mixture and reducing the graphene oxide to graphene. One of the dependent claims includes adding less than 1% conductive auxiliary agent that may be carbon black.

U.S. Pat. No. 7,907,387 entitled ELECTRODE FOR ENERGY STORAGE SYSTEMS, PRODUCTION METHOD THEREOF AND ENERGY STORAGE SYSTEM COMPRISING SAID ELECTRODE, teaches using a slurry or ink of carbon active material to form a sheet, drying and adding an aluminum mesh current collector for electrochemical double layer capacitors.

U.S. Pat. No. 6,768,631 teaches a method for preparing porous carbon material, porous carbon material and electrical double layer capacitor using the same. This patent teaches a dry mixture of carbon materials calendared onto an aluminum mesh current collector for capacitors.

Http://digitaleprints.um.edu.m/1978/7/CH6.pdf teaches the use of carbon black in slurry applied to aluminum mesh for capacitors.

The process and electrode materials of the instant invention are distinct from any of the prior art materials. Never is it suggested that the active material is an activated carbon enhanced with graphene. The use of carbon materials with an aluminum mesh is not unique, but the manufacture of a semi-dry film calendared onto an aluminum mesh is.

THE INVENTION

The invention disclosed and claimed herein pertains to fabricating extremely high gravimetric and volumetric capacitance (>200 F/g), energy density (+30 Wh/kg) and power density (+15 KW/kg) of electrochemical double layer capacitors consisting of free standing paper, slurry, or dry mixtures made with high surface carbons such as activated carbon, carbon nanofibers, carbon black, carbon aerogels, and graphemes mounted or coated on aluminum mesh as a current collector. The processes are carried out using a wet carbon paper process. The graphemes are nanosized graphene nanotubes and nanosized graphene nanoplatelets.

Electrodes for capacitors are fabricated by mounting the free standing carbon paper on aluminum mesh current collectors, followed by compressing or calendaring. The electrode can also be fabricated by coating the high surface area carbon slurries on aluminum mesh current collectors. The electrodes are also prepared by dry coating high surface area carbon powder mixtures on aluminum mesh current collectors. Such electrodes are assembled with polymeric separators and electrolytes such as ionic liquids or quaternary ammonium salts dissolved in organic solvents. It can generate >200 F/g of electrode capacitance, 200 Wh/kg of electrode energy density, 15 KW/kg of electrode power density, and 50% electrode porosity in ionic liquid electrolyte-based electrochemical double layer capacitors, which makes it feasible to develop a device with 30 Wh/kg of energy density and 15 KW/kg of power density.

Thus, what is disclosed herein is a composition of matter comprising a combination of activated carbon and graphene. By "combination", it is meant that the materials are mixed, and not merely coated on one another. In addition, this combination can be further combined with carbon nanofibers, carbon black, carbon aerogel, any combinations of the nanofibers, carbon black or carbon aerogels with the combination of activated carbon and graphene. In addition, there can be present, activated derivatives of the carbons mentioned just Supra.

In a first embodiment of this invention there is an electrochemical double layer capacitor. The capacitor comprises two aluminum mesh current collectors, each said aluminum mesh current collectors having deposited thereon, a combination of activated carbon and graphene, a separator, located between the collectors, and an electrolyte, the assumption being that each of the capacitors has a housing associated therewith.

Further, there is an embodiment which is an electrochemical double layer capacitor wherein the capacitor comprises two aluminum mesh current collectors, each said aluminum mesh current collectors having deposited thereon a combination of activated carbon, graphene, and any combination of carbons selected from the group consisting of carbon nanotubes, carbon nanofibers, carbon black, and, carbon aerogel. There is a separator, located between the collectors, and, an electrolyte.

Still further, there is a process for preparing an electrode, the process comprising providing a carbon slurry in solvent, filtering the slurry to separate the solvent and provide a wet sheet form, and thereafter, mounting the wet sheet form on an aluminum mesh substrate, and, calendaring and drying the wet sheet form to a predetermined thickness, porosity and surface finish.

There is also provided a wet carbon paper prepared by the process described just Supra. In addition, there is an embodiment that is a process for preparing an electrode, wherein the process comprises providing a carbon slurry in solvent, coating the slurry onto an aluminum mesh, and, calendaring and drying the coating to a predetermined thickness, porosity and surface finish, usually using a doctor blade to do the coating. This process also provides a wet carbon paper.

DETAILED DESCRIPTION OF THE INVENTION

Generally, prior art methods provide for preparing the electrode for electrochemical double layer capacitors by applying the formulation containing the activated carbon, a polymeric binder, and conductive agent, via slurries that are coated on aluminum foil. Generally, aluminum foil has been used as a current collector because of its high conductivity, low density, and high stability at high voltages. However, aluminum foil based-electrodes have two dimensional structures, so current collecting ability is not high enough. Metal foams can provide three dimensional structures, but are not suitable for commercialization due to their high density. Aluminum mesh as a collector can provide semi-three dimensional structures and have densities similar to that of aluminum foil. The electrochemical properties of aluminum mesh based-electrodes are increased due to improvement over current collecting capabilities with foil and foam.

Carbons useful in this invention include carbons having an average size of between 10 nm and 100 μm and a BET surface area greater than about 300 $m^2/g$. It is understood that the combination of the carbon and the graphene is the primary combination for this invention, and that this combination can be combined with other carbon structures, such as carbon nanofibers, carbon blacks, carbon aerogels, and activated derivatives of these carbons.

The aluminum mesh used as the current collector herein has a mesh size between 100 mesh and greater than 400 mesh, the preferred embodiment being from 100 mesh to 400 mesh. The thickness of the aluminum mesh current collector is less than 0.015 inches and the diameter of the aluminum mesh current collector is less than about 0.005 inches.

The separators useful in this invention can be fashioned from polypropylene, polyethylene, propylene/polyethylene combinations, polytetrafluoroethylene, and the like, known in the art. The electrolytes useful in this invention are selected from ionic liquid electrolytes and organic electrolytes, and the like.

Figure 13:
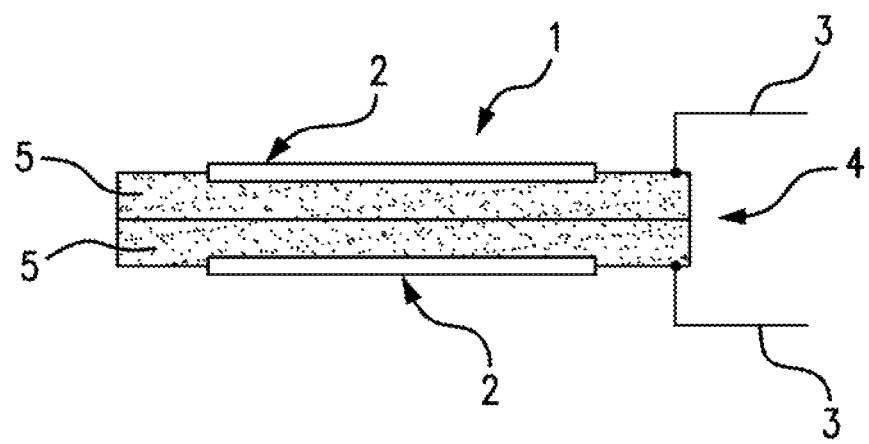
FIG. 13 shows graphically, a double layer capacitor of this invention.

FIG. 13 shows a double layer capacitor 1 of this invention wherein 2 is the carbon containing deposits, 3 is the current collectors, 4 is a separator, and 5 is the electrolyte.

EXAMPLES

Example 1

Figure 1:
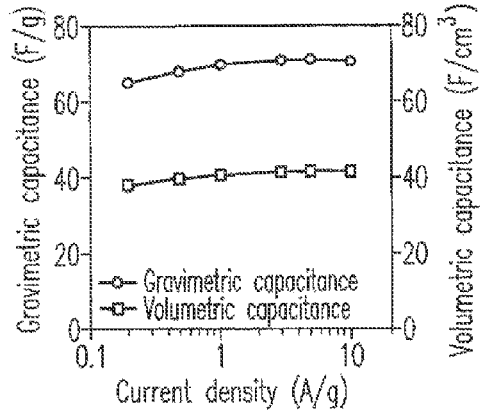
FIG. 1 shows the gravimetric capacitance results from example 1.
Figure 2:
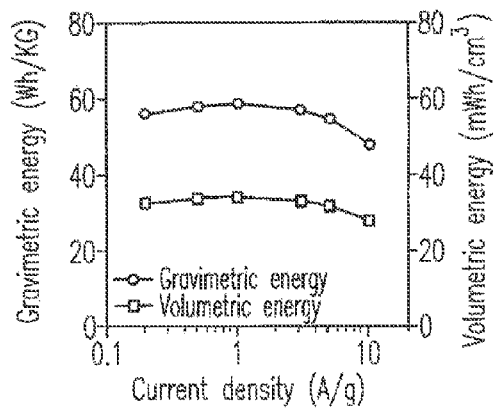
FIG. 2 shows the gravimetric energy results from example 1.

Commercial activated carbon (YP-50F, 1500 $m^2/g$, Kurary Chemical Company) was used as the active material. Multi-walled carbon nanotubes (230 $m^2/g$, Hanwha Nanotech) were used as the co-material. The activated carbon was dispersed in isopropyl alcohol using a bath type sonicator for 60 minutes and the carbon nanotubes were separately sonicated in isopropyl alcohol for one hour. The dispersed materials solutions were combined, followed by an additional 60 minutes of sonication. When the mixture (ink) was filtered using a membrane filtration system The free standing paper that was formed was calendared on aluminum mesh then dried at 80 degrees C. under vacuum for 2 hours. The electrochemical double layer capacitor was fabricated with two paper electrodes mounted on aluminum mesh and glass microfiber Whatman filter. Electrochemical testing of the electrodes was done in 1M $TEABF_4$/AN electrolyte with potential ranges between 0 and 2.5V. TEABF tetraethyl ammonium tetrafluoroborate. The results are shown in FIGS. 1 and 2. The aluminum mesh current collectors have an average diameter of about less than 0005 inches and an average thickness of about less than 0.015 inches.

The electrode was easily prepared without any polymeric binder and the composition was reduced below 5 weight percent. When the aluminum mesh was used as a current collector, high performance of over 60 F/g of specific capacitance and 50 Wh/kg of energy density, respectively, was achieved.

Example 2

Figure 3:
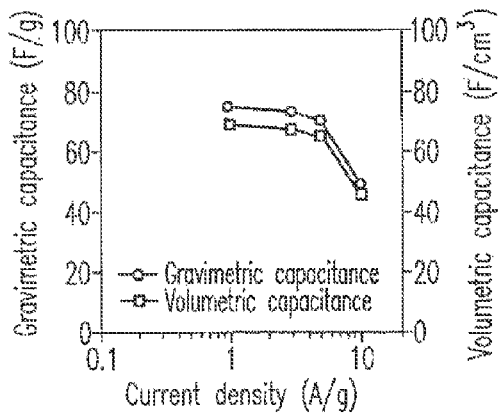
FIG. 3 shows the gravimetric capacitance results from example 2.
Figure 4:
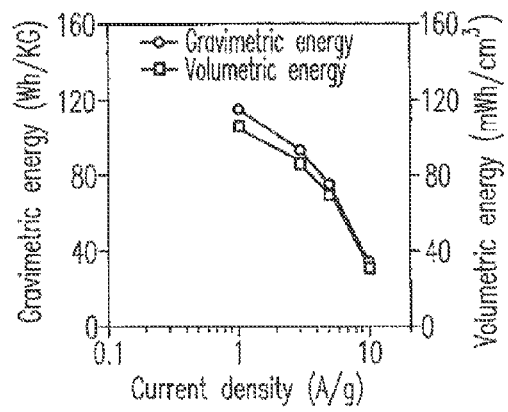
FIG. 4 shows the gravimetric energy results from example 2.

Commercial activated carbon (AC, MSP-20, 2200 $M^2/g$, Kansai Chemical Company) was used as the active material. Multi-walled carbon nanotubes (230 $m^2/g$, Hanwha Nanotech) were used as the co-material. Activated carbon was dispersed in isopropyl alcohol using a bath type sonicator for 60 minutes and the carbon nanotubes were also separately sonicated in isopropyl alcohol for 1 hour. The dispersed materials were then combined, followed by an additional 60 minutes of sonication. Then the resulting ink was filtered using a membrane filtration system. The free standing paper that was formed, was calendared on aluminum mesh then dried at 80 degrees C. under vacuum for 2 hours. The capacitor was fabricated with two paper electrode mounted on aluminum mesh and glass microfiber Whatman filter. The electrochemical properties are measure in 1M $TEAPF_6$/AN electrolyte with a potential range between 0 and 3V. The results are in FIGS. 3 and 4.

The electrode fabricated with higher surface area activated carbon achieved high specific capacitance and energy density up to 70 F/g and 110 Wh/kg at 1 A/g of current density, respectively.

Example 3

Figure 5:
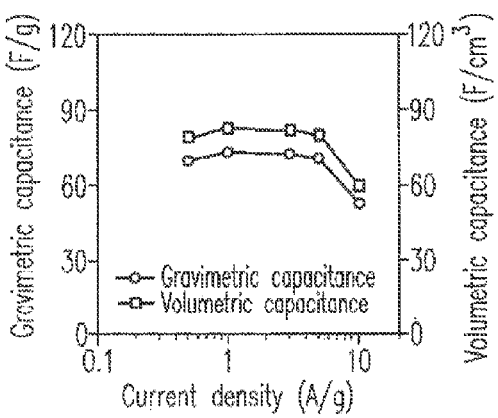
FIG. 5 shows the gravimetric capacitance results from example 3.
Figure 6:
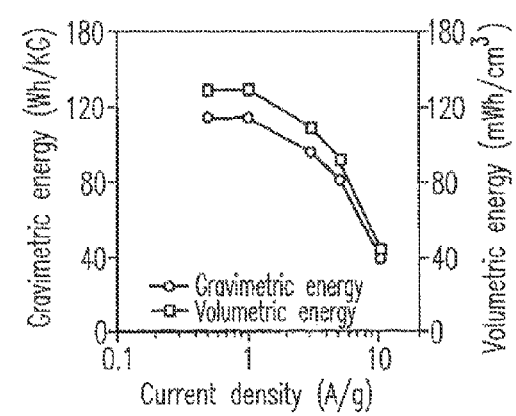
FIG. 6 shows the gravimetric energy results from example 3.

Commercial activated carbon (AC, MSP-20, 2200 $m^2/g$, Kansai Chemical Company and single-walled carbon nanotubes (SWCNT, 600 $m^2/g$, Nanocyl) were used in this example and it was handled as in Example 2. The results are in FIGS. 5 and 6.

The electrode prepared with the higher surface area activated carbon and SWCNT had high specific capacitance and energy density up to 70 F/g and 110 Wh/kg at 1 A/g of current density, respectively.

Example 4

Figure 7:
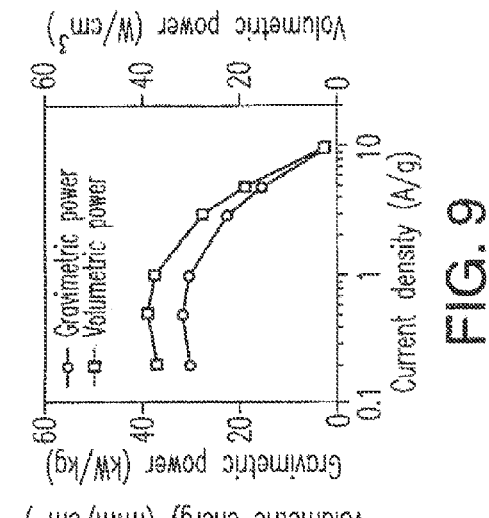
FIG. 7 shows the gravimetric capacitance results from example 4.
Figure 8:
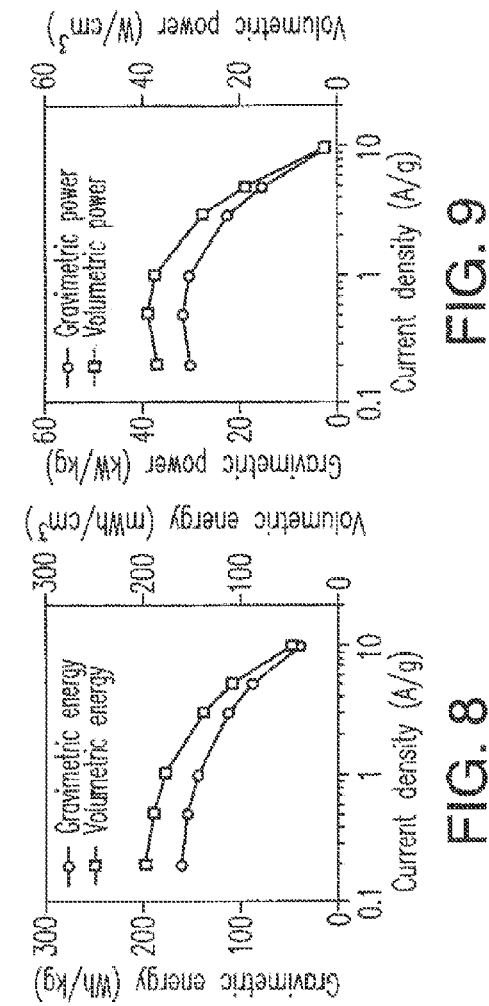
FIG. 8 shows the gravimetric energy results from example 4.
Figure 9:
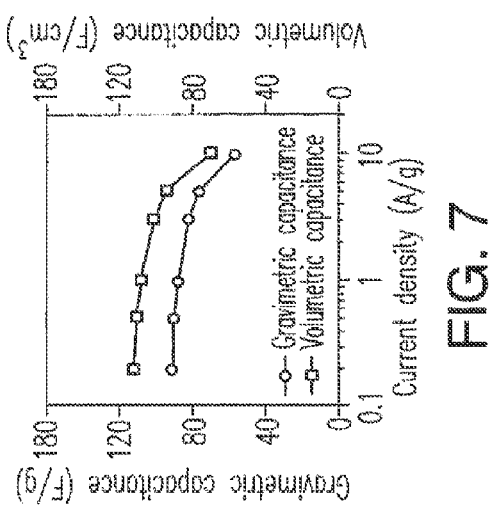
FIG. 9 shows the gravimetric power results from example 4.

Using commercial activated carbon (AC, MSP-20, 2200 m$^2$/g, Kansai Chemical Company) and Multi-walled carbon nanotube (230 m$^2$/g, Hanwha Nanotech) this example was handled as in example 2, except that EMIMBF$_4$ was the electrolyte with a potential range between 0 and 3.6 V. EMIMBF=1-ethyl-3-methylimidazolium tetrafluoroborate. The results are on FIGS. 7, 8, and 9.

The electrode had a high specific capacitance, energy density, and power density up to 90 F/g, 150 Wh/kg at 0.2 A/g of current density, respectively. The electrochemical cell also had over 50 Wh/kg of energy density based on the device.

Example 5

Figure 10:
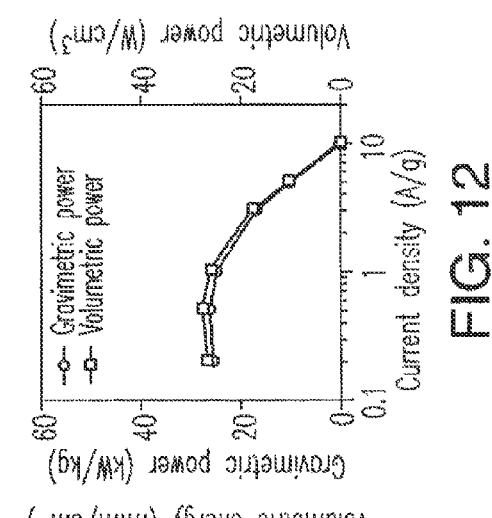
FIG. 10 shows the gravimetric capacitance results from example 5.
Figure 11:
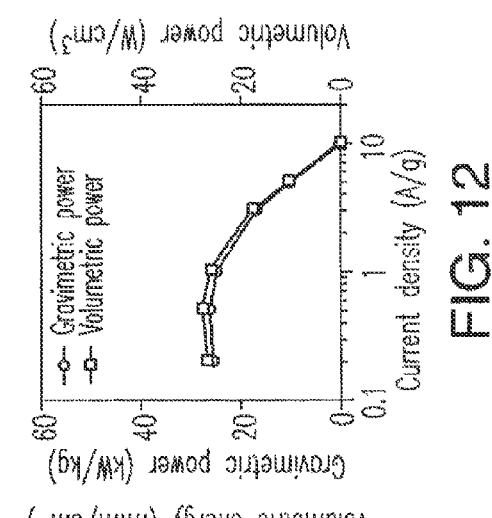
FIG. 11 shows the gravimetric energy results from example 5.
Figure 12:
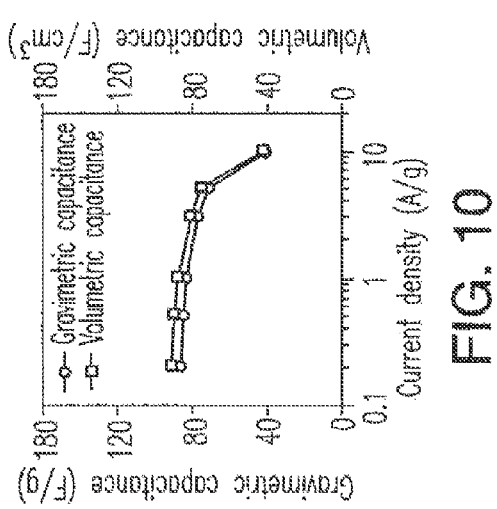
FIG. 12 shows the gravimetric power results from example 5.

Commercial activated carbon as used in example 4, and nanosized graphene (NSG: C-750, 750 m$^2$/g, XG Sciences, Lansing, Mich.) were used in this example along with multi-walled carbon nanotube as used in example 4. The electrolyte was EMIMBF$_4$. The procedure was essentially the same as in example 4. The results can be found in FIGS. 10, 11, and 12.

This electrode achieved high specific capacitance, energy density, and power density up to F/g, 150 Wh/kg, and 25 kW/kg at A/g of current density, respectively. The electrochemical cell achieved up to 50 Wh/kg of energy density based on the device.

What is claimed is:

1. An electrochemical double layer capacitor said capacitor comprising:
   at least one aluminum mesh current collector, each said aluminum mesh current collector having deposited thereon, a combination of nanosized graphite selected from nanosized graphene nanotube and, nanosized graphene nanoplatelets, and, carbon, said carbon being selected from the group consisting of:
   i. activated carbons,
   ii. carbon nanofibers;
   iii. carbon black, and,
   iv, carbon aerogels;
   a separator, located between the collectors, and, an electrolyte.

2. A electrochemical double layer capacitor as claimed in claim 1 wherein the device and the electrode energy density are >30 Wh/kg and >150 Wh/kg, respectively.

3. An electrochemical double layer capacitor as claimed in claim 1 wherein the device and the electrode power density are >15 kW/g.

4. An electrochemical double layer capacitor as claimed in claim 1 wherein said capacitor and electrode capacitance are >50 F/g and >200 F/g, respectively.

5. An electrochemical double layer capacitor as claimed in claim 1 wherein said separator membrane is a polymeric membrane selected from the group consisting essentially of polypropylene, polyethylene, a combination of polypropylene/polyethylene, and, polytetrafluoroethylene.

6. An electrochemical double layer capacitor as claimed in claim 1 wherein said electrolyte is selected from the group consisting essentially of:
   i. ionic liquid electrolytes, and,
   ii. organic electrolytes.

7. An electrochemical double layer capacitor as claimed in claim 1 wherein said aluminum mesh current collectors have an average diameter of about less than 0.005 inches.

8. An electrochemical double layer capacitor as claimed in claim 1 wherein said aluminum mesh current collectors have an average thickness of about less than 0.015 inches.

9. An electrochemical double layer capacitor as claimed in claim 1 wherein, in addition, fiber is present at 3 to 20 weight percent based on said carbon.

10. An electrochemical double layer capacitor said capacitor comprising:
    two aluminum mesh current collectors, each said aluminum mesh current collector having deposited thereon, a combination of nanosized graphite selected from nanosized graphene nanotubes and nanosized graphene nanoplatelets and, any combination of carbons selected from the group consisting of
    i. activated carbons,
    ii. carbon nanofibers;
    iii. carbon black, and,
    iv. carbon aerogels;
    a separator, located between the collectors, and, an electrolyte.

11. An electrochemical double layer capacitor as claimed in claim 10 wherein said capacitor and electrode capacitance is >50 F/g and >200 F/g, respectively.

12. An electrochemical double layer capacitor as claimed in claim 10 wherein the device and the electrode energy density are >30 Wh/kg and >150 Wh/kg, respectively.

13. An electrochemical double layer capacitor as claimed in claim 10 wherein the device and the electrode power density are >15 kW/g.

14. An electrochemical double layer capacitor as claimed in claim 10 wherein, in addition, there is fiber present at 3 to 20 weight percent based on said carbon.

15. An electrochemical double layer capacitor as claimed in claim 10 wherein said electrolyte is selected from the group consisting essentially of:
    i. ionic liquid electrolytes, and,
    ii. organic electrolytes.

16. An electrochemical double layer capacitor as claimed in claim 10 wherein said separator membrane is a polymeric membrane selected from the group consisting essentially of polypropylene, polyethylene, a combination of polypropylene/polyethylene, and, polytetrafluoroethylene.

17. An electrochemical double layer capacitor as claimed in claim 10 wherein said aluminum mesh current collectors have an average diameter of about less than 0.005 inches.

18. An electrochemical double layer capacitor as claimed in claim 10 wherein said aluminum mesh current collectors have an average thickness of about less than 0.015 inches.

19. A process for preparing an electrode, said process comprising:
    providing a carbon slurry of a combination of:
    a. Nano sized graphene and carbon in solvent, said carbon being selected from the group consisting of:
       activated carbons,
       ii. carbon nanofibers;
       iii. carbon black, and,
       iv. carbon aerogels;
    b. filtering said slurry to separate said solvent and provide a wet sheet form;

c. mounting said wet sheet form on an aluminum mesh substrate, and, d. calendaring and drying said wet sheet form to a predetermined thickness, porosity and surface finish.

20. A process as claimed in claim 19 wherein said carbon has an average size of between 10 nm and 100 μm.

21. A wet carbon paper prepared by the process of claim 19.

22. A wet carbon paper as claimed in claim 21 wherein the average BET surface area of said carbon is greater than about 300 m$^2$/g.

23. A wet carbon paper as claimed in claim 21 wherein, in addition, there is a binder present for the carbon.

24. A process for preparing an electrode, said process comprising:

a, providing a carbon slurry in solvent;

b, coating said slurry onto an aluminum mesh, and, c. calendaring and drying said coating to a predetermined thickness, porosity and surface finish;

wherein there is also present in the said carbon slurry at least one carbon material selected from the group consisting of:

i. activated carbons, ii. carbon nanofibers;

iii. carbon black, and, iv. carbon aerogels.

25. A process as claimed in claim 24 wherein said carbon has an average size of between 10 nm and 00 pm.

26. A process as claimed in claim 24, wherein said coating is carried out using a doctor blade.

27. A wet carbon paper prepared by the process of claim 24.

28. A wet carbon paper as claimed in claim 27 wherein there is, in addition, a binder for the carbon.

29. A wet carbon paper as claimed in claim 27 wherein the average BET surface area of said carbon is greater than about 300 m$^2$/g.

* * * * *